United States Patent
Unser et al.

(10) Patent No.: US 9,436,964 B2
(45) Date of Patent: Sep. 6, 2016

(54) SYSTEMS AND METHODS FOR MANDATED SERVICES VERIFICATION

(71) Applicant: MasterCard International Incorporated, Purchase, NY (US)

(72) Inventors: Kenny Unser, Fairfield, CT (US); Jean-Pierre Gerard, Croton-On-Hudson, NY (US); Kent Olof Niklas Berntsson, Rye, NY (US)

(73) Assignee: MasterCard International Incorporated, Purchase, NY (US)

(*) Notice: Subject to any disclaimer, the term of this patent is extended or adjusted under 35 U.S.C. 154(b) by 0 days.

(21) Appl. No.: 14/290,260

(22) Filed: May 29, 2014

(65) Prior Publication Data

US 2015/0348028 A1    Dec. 3, 2015

(51) Int. Cl.
  *G06K 5/00*     (2006.01)
  *G06Q 40/08*    (2012.01)
  *G06Q 30/00*    (2012.01)
  *G06Q 20/40*    (2012.01)

(52) U.S. Cl.
  CPC .............. *G06Q 40/08* (2013.01); *G06Q 20/40* (2013.01); *G06Q 30/018* (2013.01)

(58) Field of Classification Search
  CPC .... G06Q 20/00; G06Q 20/02; G06Q 20/023; G06Q 20/40; G06Q 30/018; G06Q 40/00; G06Q 40/08
  USPC ....... 235/380; 705/14.1, 14.17, 14.27–14.29, 705/14.3, 14.31, 14.34
  See application file for complete search history.

(56) References Cited

U.S. PATENT DOCUMENTS

| | | | |
|---|---|---|---|
| 8,622,287 B2 | 1/2014 | Constantine | |
| 8,732,073 B2 | 5/2014 | Thomas | |
| 2003/0212630 A1 | 11/2003 | Kahr | |
| 2012/0203608 A1* | 8/2012 | Lele ........................ | G06Q 30/00 705/14.18 |
| 2013/0332186 A1 | 12/2013 | Epstein et al. | |
| 2014/0088998 A1 | 3/2014 | Boyer et al. | |
| 2014/0279474 A1* | 9/2014 | Evans et al. ..................... | 705/41 |
| 2014/0297307 A1* | 10/2014 | Pletz et al. ........................ | 705/2 |
| 2015/0019314 A1* | 1/2015 | Salmon et al. ............ | 705/14.23 |

* cited by examiner

*Primary Examiner* — Thien M Le
*Assistant Examiner* — April Taylor
(74) *Attorney, Agent, or Firm* — Armstrong Teasdale LLP

(57) ABSTRACT

A method and system for verifying cardholder compliance or non-compliance with a mandated services requirement by a third party using a payment card payment card network coupled to a database are provided. The method includes receiving sets of predetermined parameters that each define a transaction for one or more mandated services, receiving, by the computer device, transaction data for a plurality of transactions, determining, by the computer device, transactions for one or more mandated services from the plurality of received transactions using the received sets of parameters, summarizing the transaction data from the determined transactions, and transmitting the summarized transaction data to the third party, the summarized transaction data demonstrating cardholder compliance or noncompliance with the mandated services requirement.

20 Claims, 6 Drawing Sheets

SYSTEMS AND METHODS FOR MANDATED SERVICES VERIFICATION

BACKGROUND

This disclosure relates generally to processing financial transaction data and, more particularly, to computer systems and computer-based methods for verifying purchases of mandated services.

At least some consumers may be mandated or otherwise obligated to pay for certain services during a certain period of time. For example, to maintain student enrollment for discounts or other incentives, a student may be required to show a tuition and/or semester registration payment was made. A homeowner may be required to show periodic payments to an alarm service for maintaining their property and casualty insurance. Similarly, a driver may need to show maintenance of auto insurance for driver licensing requirements. Moreover, a court may mandate classes or counseling, for example, anger management classes, as part of a resolution of a defendant's case. The court may also require verification of child support payments or that those payments are being used for child care services or other mandated expenditures.

When making payment for purchases of mandated services, the consumer (e.g., student, homeowner, driver, and defendant) may or may not have the burden of proof in showing that they are meeting their obligations. Proof may involve collecting a receipt for the payment, traveling to or posting to a third party that is responsible for verifying the payment or purchase of the mandated services was made, and receiving an acknowledgment from the third party. Such activities are time-consuming and burdensome.

In at least some cases, such payments for purchases of mandated services may be initiated using a payment card over a payment card processing network.

BRIEF DESCRIPTION

In one embodiment, a method for verifying cardholder compliance or non-compliance with a mandated services requirement by a third party using a payment card network coupled to a database includes receiving sets of predetermined parameters that each define a transaction for one or more mandated services, receiving, by the computer device, transaction data for a plurality of transactions, determining, by the computer device, transactions for one or more mandated services from the plurality of received transactions using the received sets of parameters, summarizing the transaction data from the determined transactions, and transmitting the summarized transaction data to the third party, the summarized transaction data demonstrating cardholder compliance or noncompliance with the mandated services requirement.

In another embodiment, a computer system for processing data includes a memory device and a processor in communication with the memory device. The computer system programmed to receive sets of predetermined parameters that each define a transaction for one or more mandated services, receive, by the computer device, transaction data for a plurality of transactions, determine, by the computer device, transactions for one or more mandated services from the plurality of received transactions using the received sets of parameters, summarize the transaction data from the determined transactions, and transmit the summarized transaction data to the third party, the summarized transaction data demonstrating cardholder compliance or noncompliance with the mandated services requirement.

In yet another embodiment, one or more non-transitory computer-readable storage media has computer-executable instructions embodied thereon, wherein when executed by at least one processor, the computer-executable instructions cause the processor to receive sets of predetermined parameters that each define a transaction for one or more mandated services, receive, by the computer device, transaction data for a plurality of transactions, determine, by the computer device, transactions for one or more mandated services from the plurality of received transactions using the received sets of parameters, summarize the transaction data from the determined transactions, and transmit the summarized transaction data to the third party, the summarized transaction data demonstrating cardholder compliance or noncompliance with the mandated services requirement.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example system including a plurality of computer devices in accordance with one example embodiment of the present disclosure.

FIG. 3 is an expanded block diagram of an example embodiment of a server architecture of the system including the plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 is a flow diagram of a computer-implemented method for verifying cardholder compliance or non-compliance with a mandated services requirement by a third party using a payment card network.

DETAILED DESCRIPTION

Figure 1:
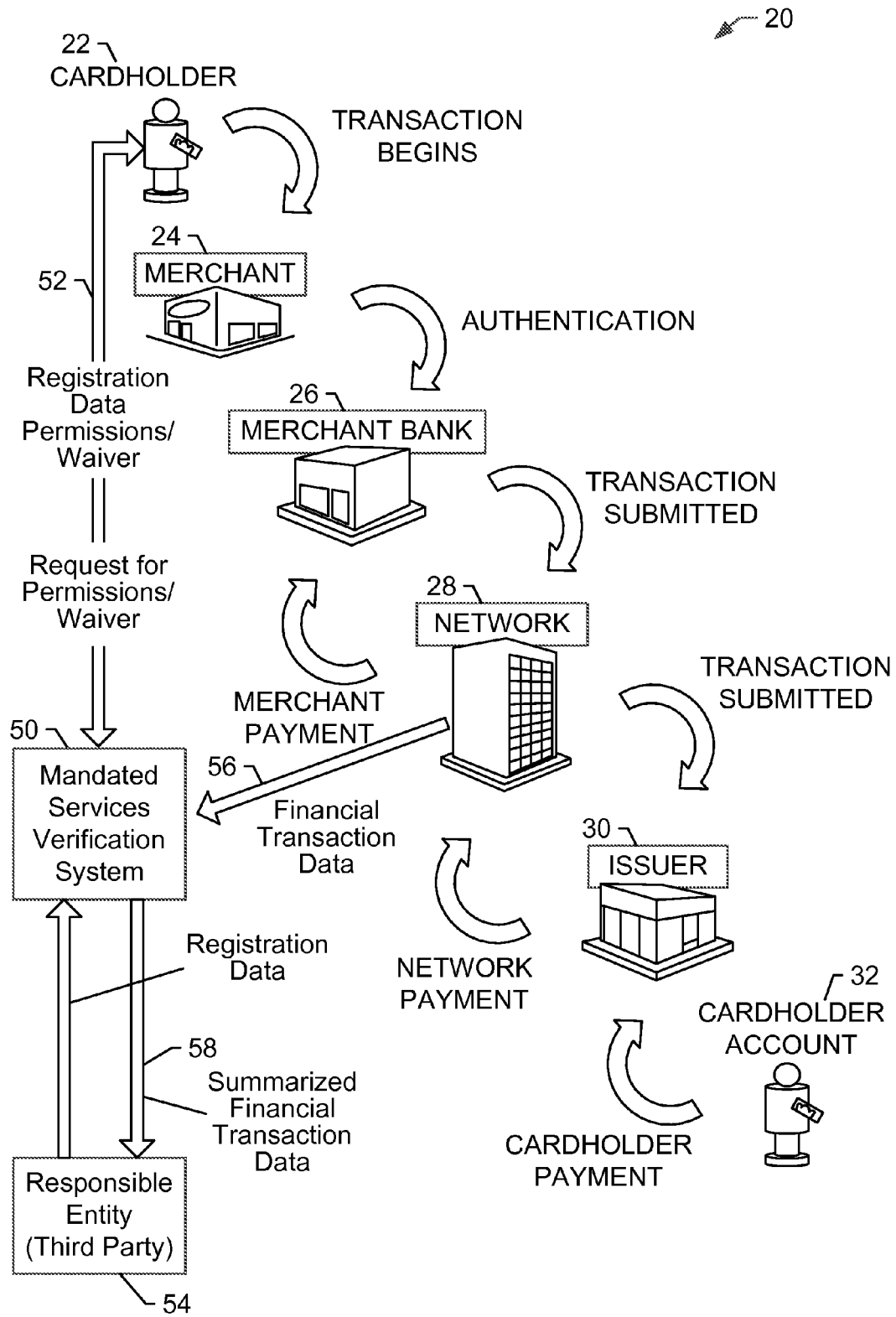
FIGS. 1-6 show example embodiments of the methods and systems described herein.

Embodiments of the methods and systems described herein relate to verifying mandated services or products. Consumers may be obligated to pay for certain services, either legally (i.e., court or government mandated) or contractually (i.e., consumer receives a benefit if consumer buys a service). In the system described herein, the mandated services are purchased by the consumer using a payment card wherein the payment card transaction is processed using a payment card network. Accordingly, as used herein, a cardholder can refer to a student, a homeowner, a driver, a defendant and/or any other consumers making payments of a mandated service or product. For example, a student and cardholder may be required to maintain enrollment in school to receive discounts on, for example, auto insurance or to be covered under their parents' insurance policies. A homeowner and cardholder may be required by their homeowner's insurance policy to maintain an alarm service to receive a discount on their property and casualty insurance or to even qualify for the insurance at all. Another example may be that a requirement for obtaining a driver's license or a vehicle registration is maintaining auto insurance on the vehicle. Court mandated requirements could include paying for anger management classes or payment of child support or that child support received is actually being used for child care services.

Often, in such cases, the consumer/cardholder may have the burden of proof in showing that they are meeting their obligations. The burden of proof may require presenting verifiable receipts for the services that are required. It may be burdensome for the entities requiring the mandated services to verify each individual obligation has been met. For example, having a large number of people bringing receipts to the entity would require extra staff to receive the receipts, verify the validity of the receipt, verify the accuracy of the receipt, and report non-compliance to the entity. Some entities may already be operating with extra staff to perform these functions currently.

Embodiments of the present disclosure describe a mandated services verification (MSV) system that uses acquired financial card transaction data to automatically verify that the cardholder is complying with the mandated requirements and to inform the responsible oversight entity of compliance and/or noncompliance with the requirements. The MSV system is configured to identify mandated transactions, appropriately summarize the transaction data, and deliver the information to a third party.

In one embodiment, the cardholder that is required to provide proof of purchasing mandated services requests processing of their transaction data using the MSV system. In other embodiments, the responsible oversight entity requests processing of the transaction data of a plurality of cardholders that are required to report the purchase of mandated services to the responsible oversight entity.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment processing system 20 for enabling ordinary payment-by-card transactions in which merchants 24 and card issuers 30 do not need to have a one-to-one special relationship. Embodiments described herein may relate to a transaction card system, such as a payment card network operated by MasterCard International Incorporated. The payment card network, as described herein, is a four-party payment card network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment card network. As used herein, financial transaction data includes a unique account number associated with a cardholder using a payment card issued by an issuer, purchase data representing a purchase made by the cardholder, including a type of merchant, amount of purchase, date of purchase, and other data, which may be transmitted between any parties of multi-party payment processing system 20.

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment processing system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card network 28 and/or issuer bank 30 stores the transaction card information, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment card network 28, and issuer bank 30.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card network 28, and then between payment card network 28 and merchant bank 26, and then between merchant bank 26 and merchant 24.

In various embodiments, multi-party payment processing system 20 includes a mandated services verification (MSV) system or module 50. MSV system 50 may be embodied in a separate system from multi-party payment processing system 20 or may be embodied as a subsystem or module of multi-party payment processing system 20. MSV receives registration data 52 from cardholder 22 and/or a third party, such as, an entity 54 responsible for verifying and/or reporting a verification of a purchase of mandated services. Registration data 52 received from cardholder 22 may be prompted for by MSV system 50. Registration data 52 may include the contact information for cardholder 22 and contact information for the responsible entity 54 and an entity to which payment will be made to purchase the mandated product or service. Registration data 52 may include an amount of the payment for the mandated product or service and a frequency of the payments (i.e., for recurring type payments, such as for insurance or the like). If cardholder 22 initiates the MSV request, a permission to release cardholder 22 personal information is included by the cardholder 22 in the original request. If the MSV request is initiated by responsible entity 54 or an agent of responsible entity 54 acting on behalf of responsible entity 54, a grant of waiver and/or permission to release the personal information of cardholder 22 to responsible party 54 is requested from cardholder 22.

Included with registration data 52 or transmitted separately, sets of MSV identification parameters that each define a transaction for one or more mandated services is received from at least one of cardholder 22, responsible entity 54, and database 120. Financial transaction data 56 is received from, for example, payment card network 28 for a plurality of transactions made by cardholder 22 and other cardholders. In the example embodiment, financial transaction data 56 includes, for example, but not limited to, a unique account number associated with a cardholder using a payment card issued by an issuer, purchase data representing a purchase made by the cardholder, including a type of merchant, amount of purchase, date of purchase, and other data, which may be transmitted between any parties of multi-party payment processing system 20. MSV-related transactions are determined for one or more mandated services from the plurality of received transactions using the received sets of MSV identification parameters. Each of the specified MSV identification parameters includes a value or a range of values that are compared to corresponding values or ranges of values included in financial transaction data 56. In various embodiments, MSV identification parameters include a flag indicating that the financial transaction data record is an MSV-related transaction. In other embodiments, MSV identification parameters include the contents of one or more financial transaction data fields, which may be used to determine that the current financial transaction data record is an MSV-related transaction.

The transaction data from the determined transactions is summarized according to parameters received in registration data 52 that specify which of the financial transaction data responsible entity 54 requires for verification that a mandated services purchase was properly made. In various embodiments, transaction data from the determined transactions is summarized such that personal data that does not relate to verifying the parameter for mandated services is removed before being transmitted. In some embodiments, only a statement that the payment was made is provided. In other embodiments, it may be necessary to provide a merchant identifier, date of the transaction, amount of the transaction, or other portion of the financial transaction data in the summarized data that is reported to responsible entity 54. The summarized financial transaction data 58 is transmitted to responsible entity 54 or other third party specified in registration data 52. The summarized transaction data 58 demonstrating cardholder compliance or noncompliance with the mandated services requirement.

More specifically, during and/or after the clearing process, additional data, such as a time of purchase, a merchant name, a type of merchant, purchase information, cardholder account information, a type of transaction, mandated services information, information regarding the purchased item and/or service, and/or other suitable information, is associated with a transaction and transmitted between parties to the transaction as transaction data, and may be stored by any of the parties to the transaction. In the example embodiment, when cardholder 22 purchases mandated services, such as, insurance, counseling services, or transfers money for mandated payments, at least partial mandated services verification information is transmitted during the clearance process as transaction data. When payment card network 28 receives the mandated services verification information, payment card network 28 routes the mandated services verification information to, for example, database 120 or MSV system 50.

Figure 2:
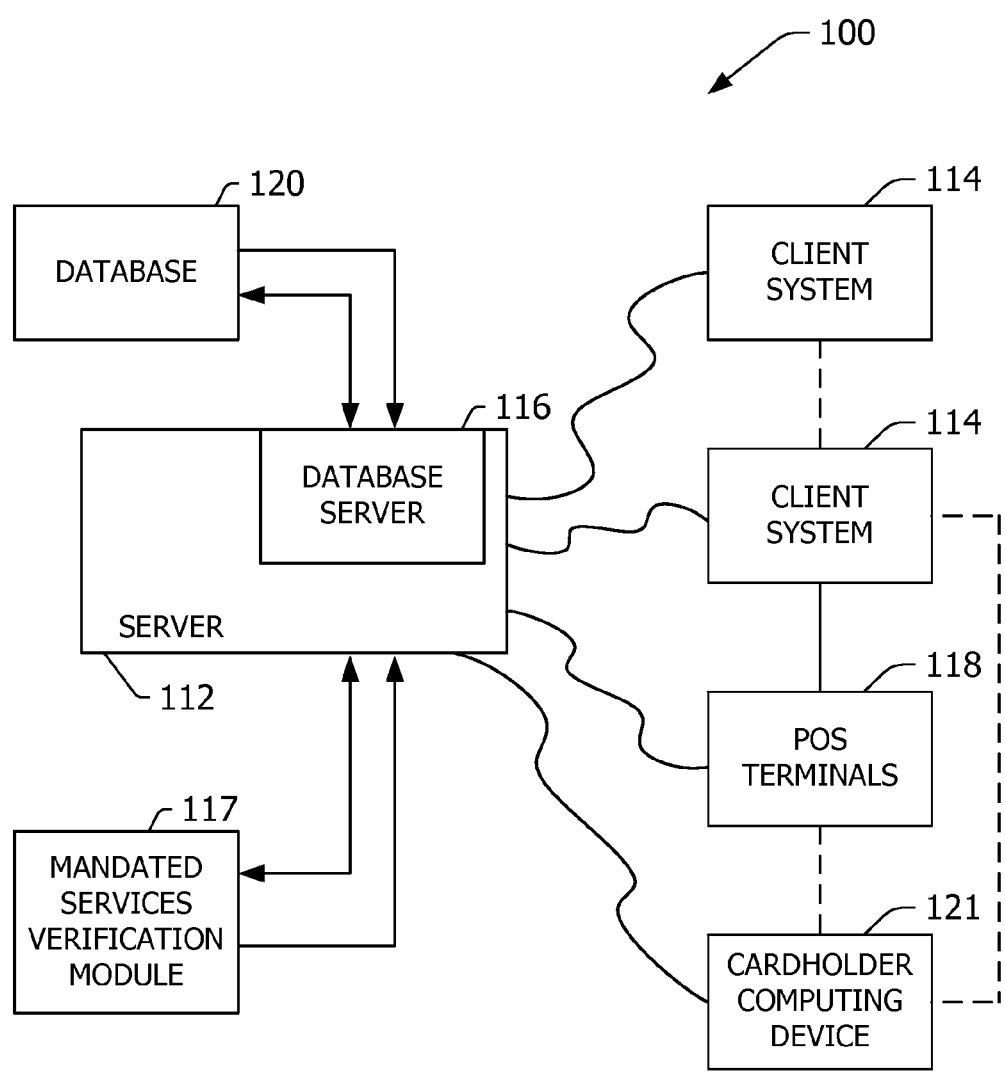

FIG. 2 is a simplified block diagram of an example processing system 100 including a plurality of computer devices, such as server system 112, client systems 114, mandated services verification (MSV) module 117, and cardholder computing device 121 in accordance with one embodiment of the present disclosure. In one embodiment payment system 100 implements a process to validate a payment card transaction. More specifically, mandated services verification module 117 in communication with server system 112 is configured to receive sets of predetermined parameters that each define a transaction for one or more mandated services. MSV module 117 is also configured to receive financial transaction data for a plurality of transactions and determine which transactions of a plurality of transactions relate to one or more mandated services using the received sets of parameters. MSV module 117 is further configured to summarize the financial transaction data from the determined transactions, and to transmit the summarized financial transaction data to a third party wherein the summarized financial transaction data demonstrates cardholder compliance or noncompliance with the mandated services requirement.

In the example embodiment, system 100 may be used for performing payment-by-card transactions and/or verifying financial transaction data relating to mandated services received as of part processing the financial transaction. For example, system 100 may receive sets of predetermined parameters that each define a transaction for one or more mandated services, receive the financial transaction data for a plurality of transactions, determine transactions for one or more mandated services from the plurality of received transactions using the received sets of parameters, summarize the financial transaction data from the determined transactions and transmit the summarized financial transaction data to the third party, the summarized financial transaction data demonstrating cardholder compliance or noncompliance with the mandated services requirement.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store sets of predetermined parameters that each define a transaction for one or more mandated services, the financial transaction data for a plurality of transactions, summarized financial transaction data associated with a cardholder mandated to purchase services and/or an entity responsible for mandated services verification, for processing according to the method described in the present disclosure. Database 120 may store flags or rules that permit determining which transactions relate to mandated services verification, contact or address data for entities that are responsible for verifying that the payments for the mandated services has been paid. The flags may simply include a value that indicates to MSV module 117 that the associated financial transaction data 56 is MSV related. The rules may correlate particular fields in financial transaction data 56 to values that indicate the record is MSV related. For example, the rules may be received during the registration process such that a payment made in the amount of XX to a merchant YY should be MSV related. In cases where the amount changes from payment-to-payment or the merchant that will be providing the services or products changes periodically, other fields of financial transaction data 56 may be used to ascertain whether the current financial transaction data 56 is MSV related or not. The entities may be the actual entity that mandated the payment, such as a court or insurance company, or an entity operating on behalf of the responsible entity. Database 120 may also store values for comparing to portions of the financial transaction data that facilitates verifying the proper payment was made and to the correct entity. For example, a threshold amount for a payment that may be compared to the amount of the actual payment made. Database 120 may also store additional information for processing transaction according to the methods described herein.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with payment card network 28. In the example embodiment, server system 112 is associated with a network interchange, such as payment card network 28, and may be referred to as a payment card computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, and/or a mandated services verification computer system. MSV module 117 may be associated with payment card network 28 or with an outside third party in a contractual relationship with payment card network 28. Accordingly, each party involved in processing transaction data are associated with a computer system shown in system 100 such that the parties can communicate with one another as described herein.

Using the payment card network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
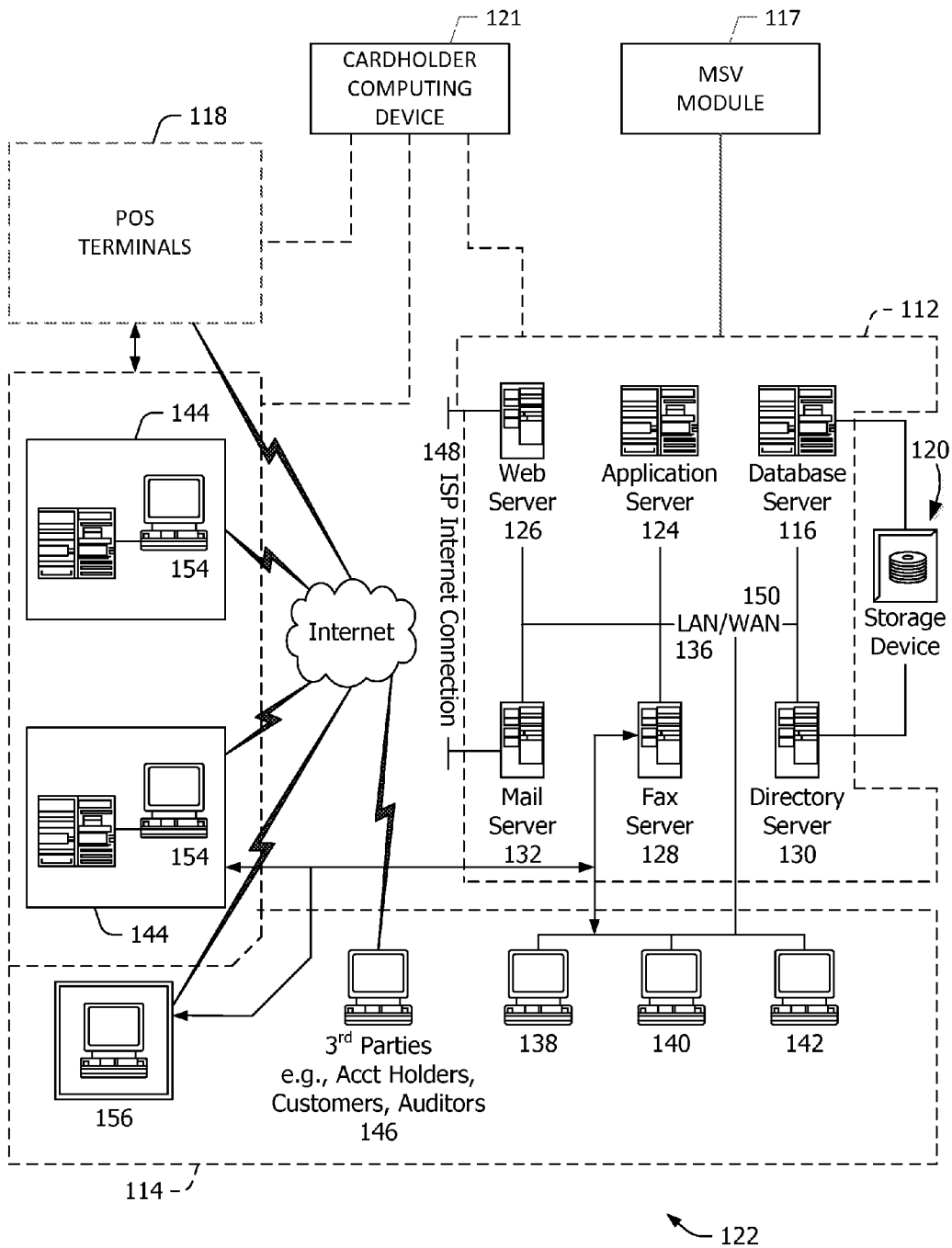

FIG. 3 is an expanded block diagram of an example embodiment of a server architecture of a processing system 122 including other computer devices in accordance with one embodiment of the present disclosure. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
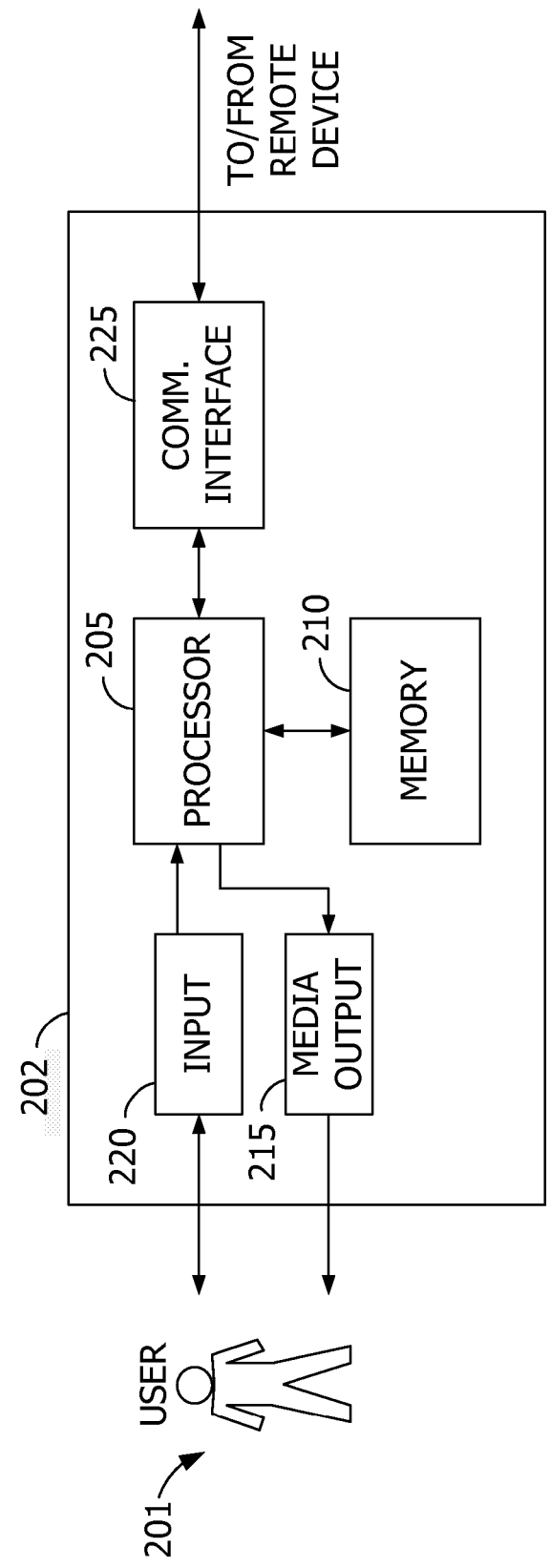

FIG. 4 illustrates an example configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
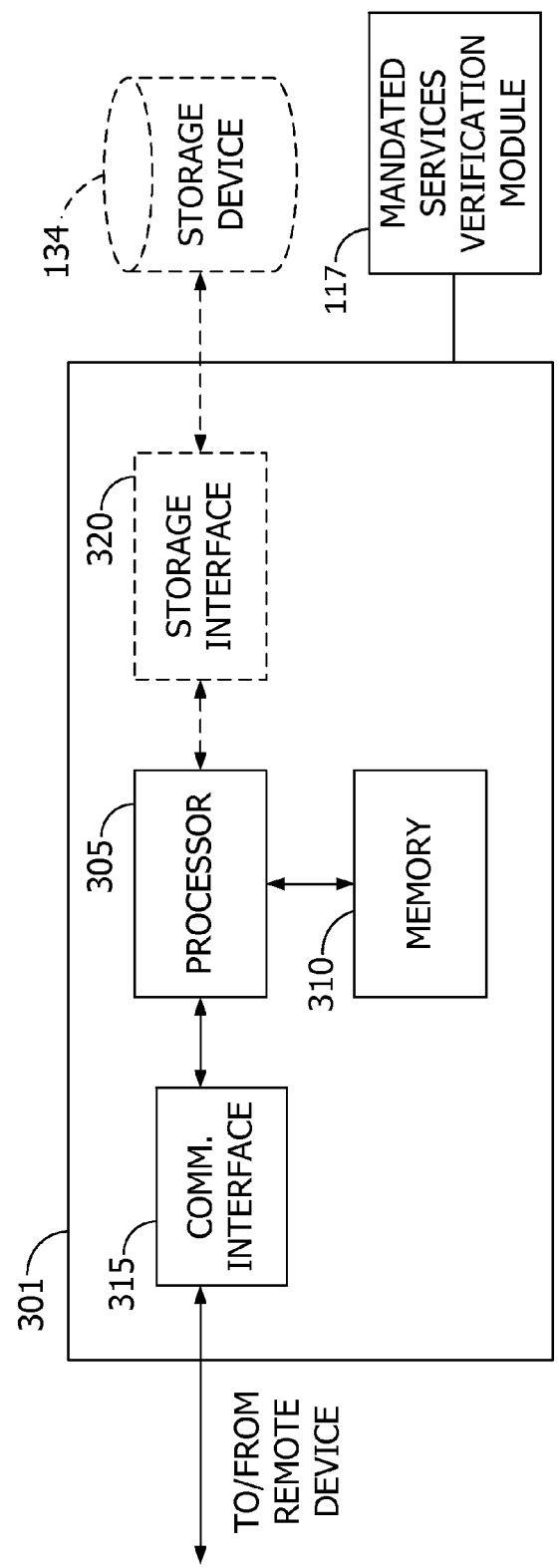

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
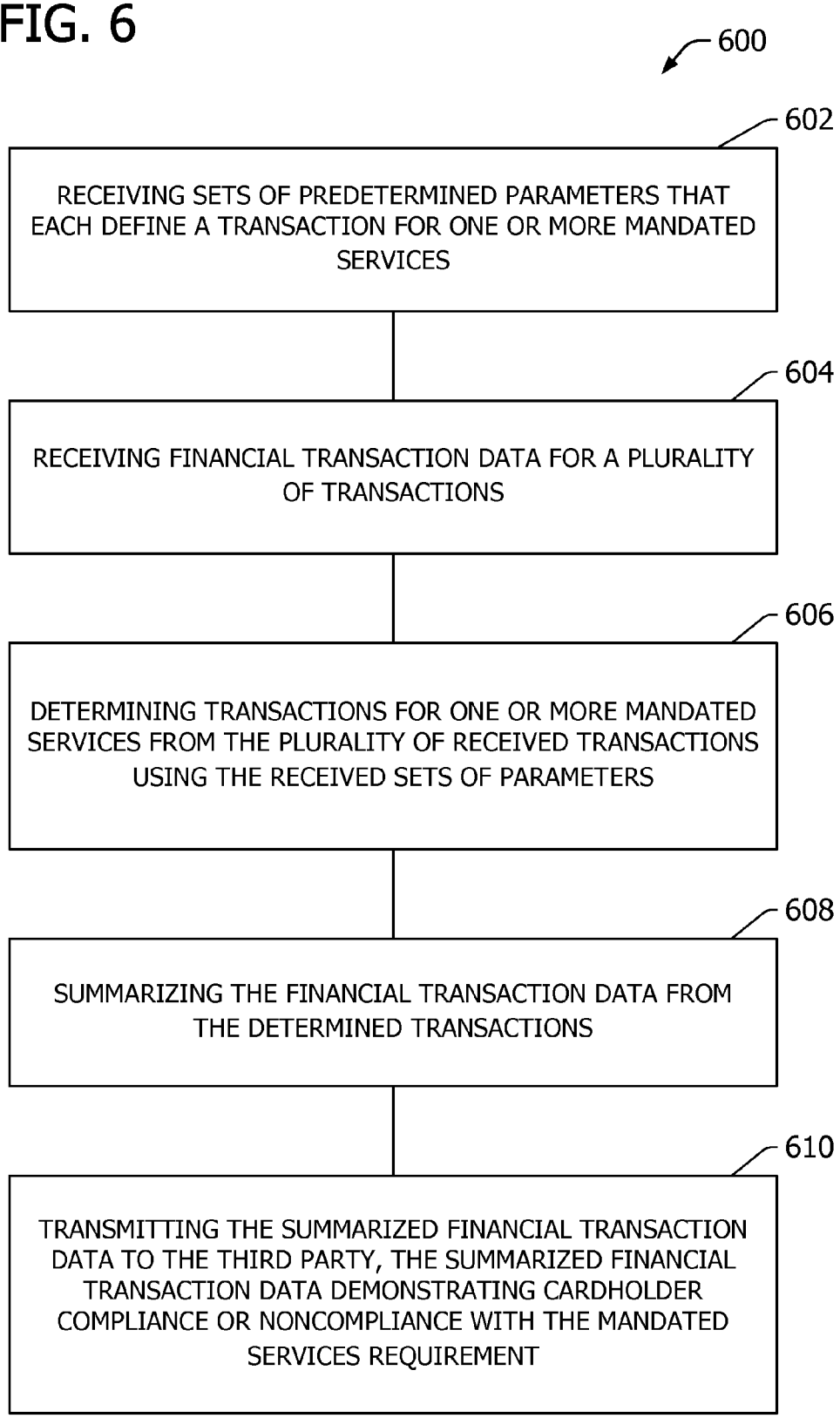

FIG. 6 is a flow diagram of a computer-implemented method 600 for verifying cardholder compliance or non-compliance with a mandated services requirement by a third party using a payment card payment card network. Method 600 is implemented using a computer device coupled to a memory device. In the example embodiment, method 600 includes receiving 602 sets of MSV identification parameters that each defines a transaction for one or more mandated services. The MSV identification parameters are received from the cardholder, responsible oversight entity, third party to whom the payment is to be made, or other interested party. The predetermined parameters are used to separate the transactions that relate to the mandated services verification from other transactions that occur in a normal course and that do not relate to the MSV system.

Method 600 also includes receiving 604, by the computer device, financial transaction data for a plurality of transactions. Some of the plurality of transactions will include transactions relating to the MSV system. For example, to maintain student enrollment for discounts or other incentives, a cardholder may be required to show a tuition and/or semester registration payment was made. A homeowner may be required to show periodic payments to an alarm service for maintaining their property and casualty insurance. Similarly, a driver may need to show maintenance of auto insurance for driver licensing requirements or lienholder requirements. Moreover, a court may mandate classes or counseling, for example, anger management classes, as part of a resolution of a cardholder's case. The court may also require verification of child support payments or that those payments are being used for child care services or other mandated expenditures.

Method 600 further includes determining 606, by the computer device, transactions for one or more mandated services from the plurality of received transactions using the received sets of parameters. The financial transaction data for each transaction is analyzed to determine which relate to the MSV system. The financial transaction data from the determined transactions is summarized 608 to remove for example, personal data that does not relate to verifying the parameter for mandated services. In some embodiments, the summarized data includes only a statement that the payment was made is provided. In other embodiments, the summarized data includes a merchant identifier, date of the transaction, amount of the transaction, or other portion of the financial transaction data. Method 600 further includes transmitting 610 the summarized financial transaction data to the third party, the summarized financial transaction data demonstrating cardholder compliance or noncompliance with the mandated services requirement by explicitly stating the MSV requirement was met or by including data that permits the responsible entity to see the data that indicates the MSV requirement was met. Method 600 optionally includes receiving sets of predetermined parameters that include at least a portion of the financial transaction data. Method 600 optionally also includes receiving summary parameters defining financial transaction data that verifies the mandated service was purchased.

In some embodiments, method 600 also includes receiving registration data from at least one of the cardholder and the third party. Additionally, method 600 may also include receiving registration data that includes a cardholder identifier, an identifier of the third party, and at least some of the predetermined parameters. Method 600 may also include receiving registration data that includes a permission of the cardholder to release the summarized financial transaction data for the cardholder to the third party. Method 600 may also optionally receive a flag that indicates which financial transaction data of each transaction is related to verifying mandated services. The flag may be embodied in a field of the financial transaction data and may include a value that when decoded indicates to the processor that the financial transaction data for the transaction currently being evaluated is related to a payment for mandated services. The financial transaction data may then be routed to, for example, a separate mandated services verification module for processing or may be processed in the current process for verification of the payment for mandated services. Moreover, method 600 may also include receiving registration data that includes one or more rules that define the portions of financial transaction data of each transaction that is related to verifying mandated services.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, 305, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of verifying mandated services provides a cost-effective and reliable means for determining which financial transactions of a plurality of financial payment card transactions relate to payments for mandated services. More specifically, the methods and systems described herein facilitate receiving financial transaction data determining the financial transaction data relating to payments for mandated services, and summarizing the financial transaction data for transmitting to a responsible third party. In addition, the above-described methods and systems facilitate maintaining personally identifiable information private and managing a cardholder's permission as it relates to releasing that personally identifiable information. As a result, the methods and systems described herein facilitate managing and verifying payments made for mandated services in a cost-effective and reliable manner.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-based method for verifying cardholder compliance with a mandated services requirement by a third party using a payment card network, the method implemented using a mandated services verification (MSV) computer device coupled to a memory device, the method comprising:

receiving, by the MSV computer device, sets of mandated services verification (MSV) identification parameters that each define a transaction for one or more mandated services;

receiving, by the MSV computer device, from the payment card network, transaction data for a plurality of cardholder transactions of a plurality of cardholders of the payment card network;

determining, by the MSV computer device, using the received sets of MSV parameters, which of the plurality of cardholder transactions are MSV-related transactions, the MSV-related transactions including mandated services purchased by at least one of the plurality of cardholders for the purpose of fulfilling a requirement imposed on the at least one of the plurality of cardholders for the mandated services;

generating, by the MSV computer device, a summary report of transactions for each mandated service required by the third party; and electronically transmitting the generated summary report, from the MSV computer device to a corresponding electronic device of the third party, the generated summary report demonstrating cardholder compliance or noncompliance with the mandated services requirement.

2. The computer-based method of claim 1, wherein receiving sets of predetermined parameters comprises receiving sets of MSV identification parameters that include at least a portion of the transaction data.

3. The computer-based method of claim 1, further comprising receiving summary parameters defining transaction data that verifies the mandated service was purchased.

4. The computer-based method of claim 1, further comprising receiving registration data from at least one of the plurality of cardholders and the third party.

5. The computer-based method of claim 4, wherein receiving registration data comprises receiving registration data that includes a cardholder identifier, an identifier of the third party, and at least some of the predetermined parameters.

6. The computer-based method of claim 4, wherein receiving registration data comprises receiving registration data that includes a permission of a particular cardholder of the plurality of cardholders to release the summarized transaction data for the particular cardholder to the third party.

7. The computer-based method of claim 4, wherein receiving registration data comprises receiving a flag that indicates which transaction data of each MSV-related transaction is related to verifying mandated services.

8. The computer-based method of claim 4, wherein receiving registration data comprises receiving a rule that defines portions of transaction data of each MSV-related transaction that is related to verifying mandated services.

9. A mandated services verification (MSV) computer system for processing financial transaction data including data for financial transactions of mandated services, the computer system comprising a memory device and a processor in communication with the memory device, the MSV computer system programmed to:

receive, by the MSV computer system, sets of predetermined parameters that each define a transaction for one or more mandated services;

receive, by the MSV computer device, transaction data for a plurality of cardholder transactions that have completed a clearing process by a payment card network separate from the MSV computer device;

determine, by the MSV computer device, using the received sets of predetermined parameters, which of the plurality of cleared cardholder transactions are MSV-related transactions, the MSV-related transactions including mandated services purchased by a cardholder of the payment card network for the purpose of fulfilling a requirement imposed on the cardholder for the mandated services;

generate, by the MSV computer device, a summary report of transactions for each mandated service required by a third party different from the MSV computer system and the payment card network; and electronically transmit at least one of the generated summary reports, from the MSV computer device to a corresponding electronic device of the third party, the at least one summary report demonstrating cardholder compliance or noncompliance with the mandated services requirement.

10. The computer system of claim 9, wherein said computer system is further programmed to receive sets of predetermined parameters that include at least a portion of the transaction data.

11. The computer system of claim 9, wherein said computer system is further programmed to receive summary parameters defining transaction data that verifies at least one of the mandated services was purchased.

12. The computer system of claim 9, wherein said computer system is further programmed to receive registration data from at least one of the cardholder and the third party.

13. The computer system of claim 12, wherein said computer system is further programmed to receive registration data that includes a cardholder identifier, an identifier of the third party, and at least some of the predetermined parameters.

14. The computer system of claim 12, wherein said computer system is further programmed to receive registration data that includes a permission of the cardholder to release the summarized transaction data for the cardholder to the third party.

15. One or more non-transitory computer-readable storage media having computer-executable instructions embodied thereon, wherein when executed by at least one processor, the computer-executable instructions cause a mandated services verification (MSV) processor to:

receive, by the MSV processor, sets of predetermined parameters that each define a transaction for one or more mandated services;

receive, by the MSV processor, transaction data for a plurality of cardholder transactions that have completed a clearing process by a payment card network separate from the MSV computer device;

determine, by the MSV processor, using the received sets of predetermined parameters, which of the plurality of cleared cardholder transactions are MSV-related transactions, the MSV-related transactions including mandated services purchased by a cardholder of the payment card network for the purpose of fulfilling a requirement imposed on the cardholder for the mandated services;

generate, by the MSV processor, a summary report of transactions for each mandated service required by a third party different from the MSV processor and the payment card network; and electronically transmit at least one of the generated summary reports, from the MSV processor to a corresponding electronic device of the third party, the at least one summary report demonstrating cardholder compliance or noncompliance with the mandated services requirement.

16. The computer-readable storage media of claim 15, wherein the computer-executable instructions further cause the MSV processor to receive sets of predetermined parameters that include at least a portion of the transaction data.

17. The computer-readable storage media of claim 15, wherein the computer-executable instructions further cause the MSV processor to receive summary parameters defining transaction data that verifies at least one of the mandated services was purchased.

18. The computer-readable storage media of claim 15, wherein the computer-executable instructions further cause the MSV processor to receive registration data from at least one of the cardholder and the third party.

19. The computer-readable storage media of claim 18, wherein the computer-executable instructions further cause the MSV processor to receive registration data that includes a cardholder identifier, an identifier of the third party, and at least some of the predetermined parameters.

20. The computer-readable storage media of claim 15, wherein the computer-executable instructions further cause the MSV processor to receive registration data that includes a permission of the cardholder to release the summarized transaction data for the cardholder to the third party.

* * * * *